United States Patent [19]

Marks

[11] Patent Number: 4,696,205

[45] Date of Patent: Sep. 29, 1987

[54] THREE-SPEED PLANETARY TRANSMISSION

[75] Inventor: Jeffrey C. Marks, Waterloo, Iowa

[73] Assignee: Deere & Company, Moline, Ill.

[21] Appl. No.: 826,164

[22] Filed: Feb. 4, 1986

[51] Int. Cl.$^4$ .............................................. F16H 57/10
[52] U.S. Cl. ........................................ 74/767; 74/766; 74/781 R
[58] Field of Search ................... 74/767, 766, 781 R, 74/782, 783

[56] References Cited

U.S. PATENT DOCUMENTS

| | | | |
|---|---|---|---|
| 2,194,954 | 3/1940 | Ravigneaux | 74/761 |
| 2,195,498 | 4/1940 | Rockwell | 74/752 E |
| 2,239,973 | 4/1941 | Ravigneaux | 74/767 |
| 2,308,082 | 1/1943 | Johnson | 74/767 |
| 2,341,512 | 2/1944 | Burtnett | 74/752 C |
| 2,414,388 | 1/1947 | Orr et al. | 74/766 |
| 2,437,314 | 3/1948 | Berndtson | 74/792 |
| 2,440,613 | 4/1948 | Orr | 74/766 |
| 2,440,625 | 4/1948 | Wiemer | 74/766 |
| 2,467,226 | 4/1949 | Place | 74/681 |
| 2,722,141 | 11/1955 | Swift | 74/763 |
| 2,755,688 | 7/1956 | Swennes | 74/688 |
| 3,063,309 | 11/1962 | Grattan | 74/767 X |
| 3,106,107 | 10/1963 | Hardy | 74/767 X |

OTHER PUBLICATIONS

*Product Engineering*, "Planetary Gear Systems", John H. Glover, Product Design Engineer, Ford Motor Co., 1/6/64.

*Primary Examiner*—Leslie Braun
*Assistant Examiner*—Dwight G. Diehl

[57] ABSTRACT

A three-speed planetary transmission having a single ring gear and dual planetary gear sets meshing with the single ring gear. Gear changes are effected by coupling or alternately fixing a set of two sun gears which mesh with the two planetary gear sets. This transmission can provide a direct drive and two other speed ratios. Utilizing a single ring gear in combination with two planetary gear sets allows nesting of gear elements and economy of space for the transmission.

10 Claims, 2 Drawing Figures

THREE-SPEED PLANETARY TRANSMISSION

BACKGROUND OF THE INVENTION

1. Field of the Invention

This invention relates generally to planetary transmissions. More specifically, this invention is related to a three-speed planetary transmission.

2. Description of the Prior Art

There are known a great many arrangements of planetary transmissions for providing various speed ratios from a drive shaft to a driven shaft. These transmissions often use multiple planetary and ring gear sets to provide various speeds. U.S. Pat. No. 2,755,688 issued to Swennes illustrates a planetary transmission for providing two forward and one reverse speeds and is only one example of the use of multiple ring gear and planetary systems to provide the speed changes. It is well known that such transmissions provide the advantage of allowing speed changes without disengagement or movement of gears. Another system showing a multiplicity of planetary elements in combination with control means such as brakes and one-way clutches for obtaining desired speed ratios is shown in U.S. Pat. No. 2,308,082 issued to Johnson. However, as Swennes and Johnson demonstrate, such systems usually employ numerous interconnections for coupling planetary carriers, ring gears and sun gears which make the resulting transmission bulky and expensive to fabricate.

Accordingly, it is an object of this invention to provide a planetary transmission having a reduced number of operating elements, a simple method of controlling speed changes and a compact design that is more straightforward in operation.

It is a further object of this invention to provide a planetary transmission in which planetary elements may be nested to reduce the overall size of the transmission.

SUMMARY OF THE INVENTION

Accordingly, there is disclosed a three-speed planetary transmission for transferring power from a drive axle to a driven axle. The transmission has one ring gear non-rotatably attached to a first drivable axle and two planetary gear sets meshing with the ring gear. The planetary gear sets are rotatably mounted on a planet carrier which is non-rotatably attached to a second drivable axle. Each planetary gear set meshes with an additional speed control gear. Both speed control gears are coaxial with the ring gear and axles. Gear ratios within the transmission are changed by applying a brake to the first or second speed control gear or coupling the speed control gears to establish direct drive between the shafts. These shafts can be rotatably connected by the ring gear, planetary gear sets and speed control gears to give up to three speed changes.

In another embodiment of the invention, one of the planetary gear sets includes idler gears to provide a directional change along with the speed control changes.

In yet another embodiment of the invention, one of the planetary gear sets is composed of double gear elements having inner and outer gears with the inner gears meshing with the ring gear and the outer gears meshing with a sun gear.

In a yet further embodiment, the inner gears of the double gear elements are in a common plane of rotation with the first planetary gear set.

Other objects and embodiments of this invention will become apparent from the detailed description that follows.

DETAILED DESCRIPTION OF THE PREFERRED EMBODIMENT

Figure 1:
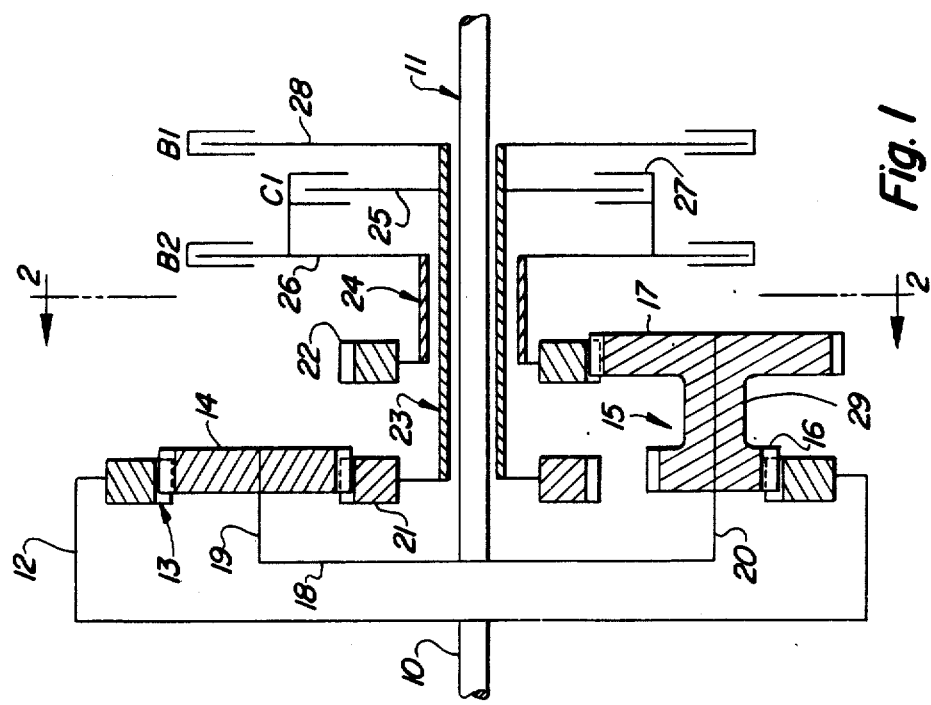
FIG. 1 is a schematic view of the transmission of this invention.

The arrangement of the transmission in accordance with this invention is shown in FIG. 1. For the sake of clarity, the transmission has been shown schematically without bearings, sleeves, guides or other components which are well known by those skilled in the art. The transmission consists of a drive shaft and a driven shaft, which in this embodiment are shown as shafts 10 and 11, respectively. As used herein with respect to gears, the terms "inner" and "outer" refer to the axial position of the gears, "inner" gears being axially closer to the driveshaft 10 than "outer" gears.

Drive shaft 10 is attached to a ring gear 12 having internal teeth 13. Ring gear 12 is concentric with drive shaft 10 and rigidly attached for rotation therewith. Internal teeth 13 mesh with a planetary gear set 14 having single gears and with a planetary gear set 15 made up of double gear elements. Double planetary gear set 15 has an inner ring contact gear 16 which is rigidly attached to a coaxial outer gear 17 by a shaft 29. The diameter of the planetary gears in each gear set may be varied along with the number of teeth to alter the gear ratio as desired within the transmission. In this embodiment, planetary gear 17 is shown having a larger diameter and a greater number of teeth than the planetary gear 14, which in turn has a larger diameter and more teeth than inner planetary gear 16.

Both planetary gear sets 14 and 15 are supported by a common planet carrier 18. Planet carrier 18 is rigidly attached to and concentrically located about driven shaft 11 for rotation therewith. Planetary gear set 14 and planetary gear set 15 are rotatably attached about their centers to planet carrier 18 by suitable shaft bearing assemblies 19 and 20, respectively.

Rotary movement is transferred to driven shaft 11 from ring gear 12 through either or both of planetary gear sets 14 and 15. The transfer of rotation through the planetary gear sets 14 and 15 is determined by the rotational condition of inner and outer sun gears 21 and 22, respectively, which act as speed control gears. Sun gears 21 and 22 are the same diameter in this preferred embodiment, but may have different diameters depending on the desired gear radius. Inner sun gear 21 meshes with the single planetary gear set 14 and is non-rotatably attached to one end of a hollow shaft 23 which is positioned concentrically over, and capable of rotation about, driven shaft 11. At its opposite end, a brake rotor 28 and a clutch disc 25 are non-rotatably attached to shaft 23. A brake caliper B1 is positioned over brake rotor 28 for engagement therewith. Outer sun gear 22 meshes with outer planetary gear set 17 and is also non-rotatably attached to one end of a hollow shaft 24. Shaft 24 is positioned concentrically over shaft 23 for rotation thereabout. At an end opposite sun gear 22, a brake rotor 26 is non-rotatably attached to shaft 24. Brake rotor 26 cooperates with a brake caliper B2 and also has attached a clutch caliper 27 for engaging a clutch C1. Brakes B1, B2 and clutch C1 are used to control the rotation of sun gears 21 and 22 and effect speed changes within the transmission in a manner hereinafter described and are of ordinary construction well-known to those skilled in the art.

Figure 2:
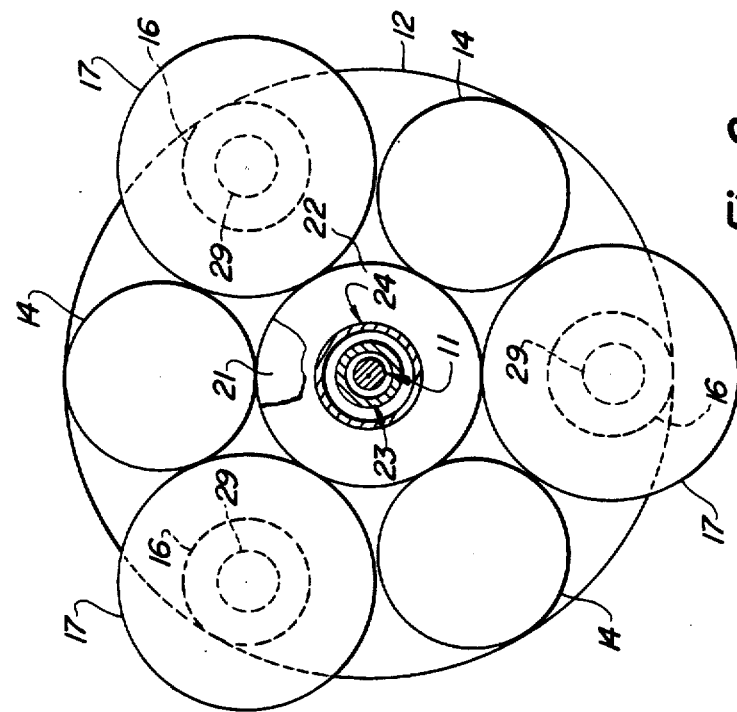
FIG. 2 is a view of the planetary gear sets taken along section A—A.

Sun gear 21 is also shown in a common plane of rotation with ring gear 13, single planet gear set 14 and inner planet gear 16. By locating these gears in the same plane of rotation and meshing both single planet gear set 14 and inner planet gear 16 with the same portion of the ring gear, it is possible to nest planet components thereby minimizing the space necessary for the transmission. The nesting of the components can be more fully appreciated from FIG. 2, which shows a plan of the planetary gear components. At the very center of the planetary arrangement is driven shaft 11. About the outside of shaft 11 is hollow shaft 23 to which is attached the inner sun gear 21. Around the outside of shaft 23 is second shaft 24 to which is attached outer sun gear 22. The innermost sun gear meshes with the three gears of planetary gear set 14 which are in contact with ring gear 12. The outer sun gear 22 meshes with three outer gears 17 of the double planetary gear set 15 while inner planetary gear 16 of the double planetary gear set mesh with ring gear 12. This plan view shows the nesting of planetary elements which is achieved by placing planetary gears 14 and 16 in contact with the ring gear.

Operation

Through the engagement of the brake and clutch assemblies, the transmission can be operated to provide three speed ratios; a direct drive, a first underdrive and a second underdrive from the drive shaft to the driven shaft. The following table indicates the engagement of the elements with an X that will provide the listed speed ratios.

| SPEED | ELEMENT | | | | |
|---|---|---|---|---|---|
| | Carrier | Ring | C1 | B1 | B2 |
| Direct Drive<br>1:1 | Input/<br>Output | Output/Input | X | — | — |
| 1st Underdrive<br>$\frac{R1 \times P3}{S2 \times P2 + R1 \times P3}$ :1 | Output | Input | — | — | X |
| 2nd Underdrive<br>$\frac{R1}{S1 + R1}$ :1 | Output | Input | — | X | — |
| 2nd Overdrive<br>$\frac{S1}{R1} + 1$ :1 | Input | Output | — | X | — |
| 1st Overdrive<br>$\frac{S2}{R1} \times \frac{P2}{P3} + 1$ :1 | Input | Output | — | — | X |

Looking first then at the direct drive condition, this condition is brought about by the engagement of clutch C1. When clutch C1 is engaged, inner sun gear 21 is coupled to the outer sun gear 22 so that the sun gears revolve as a unit. Coupling the sun gears causes planet carrier 18 to rotate at the same speed as the driven axle in ring gear 12. The unitary movement of the ring 12 and the planet carrier is the result of planet gear sets 14 and 15 attempting to impose different rotational speeds upon the coupled sun gears. This can be seen by considering the planetary gear carrier to be fixed and looking at the rotations put on the sun gear. With the planet carrier fixed, the smaller planet gears 16 acting in combination with the larger outer gear 17 would tend to impose a higher rotational speed on sun gear 22 than the rotational speed provided by planet gear 14 acting on sun gear 21. Thus, the planet gears and sun gears revolve as a unit.

Continuing down the table, a first underdrive speed is obtained by engaging only brake B2. When brake B2 is engaged, sun gear 22 is fixed and sun gear 21 is free to rotate. In this condition, rotation of the ring gear 12 causes second planetary gear set 15 to rotate about the sun gear 22. Rotation of the second planetary gear set 15 causes rotation of planet gear carrier 18 and rotation of the driven shaft 11. Since neither brake B1 or C1 is engaged, the inner sun gear is free to rotate and revolves idly under the influence of planet carrier 18 and ring gear 12. The speed change ratio is given by the proportional relationship under the speed heading of the above table with R1, P2, P3 and S2 equal to the gear pitch diameters of ring gear 12, inner planet gear 16, outer planet gear 17 and outer sun gear 22, respectively.

The second underdrive speed, is obtained by engaging brake B1 alone. When brake B1 is engaged, sun gear 21 is fixed relative to driven shaft 10. Revolution of driven shaft 10 causes ring gear 12 to rotate. As ring gear 12 rotates, single planetary gear set 14 revolves about sun gear 21 imparting rotation to planet gear carrier 18 and shaft 11. In this condition, neither clutch C1 or brake B2 is engaged and sun gear 22 revolves idly under the influence of ring gear 12 and double planetary gear set 15. The above table again gives the speed change ratio for this condition with S1 equal to the pitch diameter of inner sun gear 21.

By reversing the functions of shaft 10 and 11, it is also possible to obtain overdrive speeds from the above-described planetary transmission. These overdrive speeds are shown below the underdrive speeds in the above table. The overdrive speeds are obtained by the alternate engagement of brakes B1 and B2 in the manner hereinbefore described. Fixing sun gears 21 or 22 against rotation will drive the corresponding planet gear against the sun gear imparting rotation to ring gear 12 and ultimately output from ring gear shaft 10.

The foregoing table and sizing of the planetary gears represents only a limited amount of gear combinations to which the transmission arrangement may be applied. Certain components within this transmission may be further simplified or modified to alter the function of the transmission. For example, the transmission may be simplified by replacing the double planetary gear set 15 with long planetary gears having a single row of teeth by extending the length of the gears and increasing the size of the outer sun gear 22 to mesh with the outer portion of the planetary gears. Or a reverse function may be added to the transmission by making the outer planetary gears 17 of the double planetary set reverse idler gears that rotate about additional gear shafts on carrier 18 and mesh with the inner planetary gear set and the outer sun gear. Those skilled in the art are aware of other such variations and modifications that may be used in practicing this invention. Thus such modifications and variations are within the scope of this invention which is only to be limited by the appended claims.

I claim:

1. A multispeed planetary transmission for transferring power between a ring gear shaft and a carrier shaft comprising:

(a) a ring gear fixed concentrically to a ring gear shaft;

(b) a first planet gear set having planet gears all of which mesh with said ring gear;

(c) a second planet gear set having axially inner planet gears meshing with said gear and axially outer planet gears coaxial and coupled for rotation with said inner planet gears;

(d) a planet carrier attached concentrically and non-rotatably to a carrier shaft and having said first and second planet gear sets rotatably mounted thereon;

(e) an axially inner sun gear concentric with said shafts and meshing with said gears of said first planet gear set;

(f) an axially outer speed control gear concentric with said shafts and meshing with said outer planet gears of said second planet gear set;

(g) means for coupling said outer speed control gear with said inner sun gear to obtain a direct drive between said ring gear shaft and said carrier shaft;

(h) means for preventing rotation of said inner sun gear to obtain a first speed ratio between said shafts; and (i) means for preventing rotation of said outer speed control gear to obtain a second speed ratio between said shafts.

2. The planetary transmission of claim 1 wherein said outer speed control gear is a sun gear.

3. The planetary transmission of claim 1 wherein said first planet gear set, said inner planetary gears and said inner sun gear lie substantially in a common plane.

4. The planetary transmission of claim 1 wherein said outer speed control gear is a sun gear.

5. The planetary transmission of claim 4 wherein said outer planetary gears are larger in diameter than said inner planetary gears and said inner and outer sun gears have the same diameter.

6. The planetary transmission of claim 4 wherein said first planet gear set, said inner planetary gears and said inner sun gear lie substantially in a common plane.

7. A planetary transmission for transferring power between first and second axially aligned shafts, said transmission comprising:

(a) a ring gear non-rotatably attached to and concentric with said first shaft and having internal teeth about its periphery;

(b) a planet carrier non-rotatably attached to and concentric with said second shaft, having first and second planet gear sets, said second planet gear set comprising double gears having first and second planet gears coupled to each other along a common axis of rotation, said first planet gear of each double gear meshing with said internal teeth;

(c) a first sun gear concentric with said shafts and meshing with said first planet gear set, said first sun gear, first planet gear set, and first planet gears of said second planet gear set lying substantially in a common plane;

(d) a second sun gear concentric with said shafts and meshing with said second planet gears of said second planet gear set;

(e) a first brake for preventing rotation of said first sun gear;

(f) a second brake for preventing rotation of said second sun gear; and (g) a clutch for coupling said first sun gear to said second sun gear.

8. The planetary transmission of claim 7 wherein said second planet gears are larger in diameter than said first planet gears and said first sun gear has a diameter equal to the diameter of the second sun gear.

9. The planetary transmission of claim 7 wherein said first shaft is a drive shaft, said second shaft is a driven shaft and said first brake, second brake and said clutch can be alternately activated to give respective first underdrive, second underdrive and direct drive speed ratios.

10. The planetary transmission of claim 7 wherein said first shaft is a driven shaft, said second shaft is a drive shaft and said first brake, second brake and said clutch can be alternately activated to give respective first overdrive, second overdrive and direct drive speed ratios.

* * * * *

UNITED STATES PATENT AND TRADEMARK OFFICE
CERTIFICATE OF CORRECTION

PATENT NO. : 4,696,205

DATED : 29 September 1987

INVENTOR(S) : Jeffrey C. Marks

It is certified that error appears in the above-identified patent and that said Letters Patent is hereby corrected as shown below:

```
Col. 5, line 6, after "said" insert -- ring --;
        line 30, change "planetary" to -- planet --;
        line 35, change "planetary" to -- planet --; and
        line 36, change "planetary" to -- planet --.
```

Signed and Sealed this

Twenty-first Day of June, 1988

*Attest:*

DONALD J. QUIGG

*Attesting Officer*        *Commissioner of Patents and Trademarks*